No. 834,839. PATENTED OCT. 30, 1906.
P. C. MITCHELL.
SEED PLANTER.
APPLICATION FILED APR. 23, 1906.
2 SHEETS—SHEET 2.
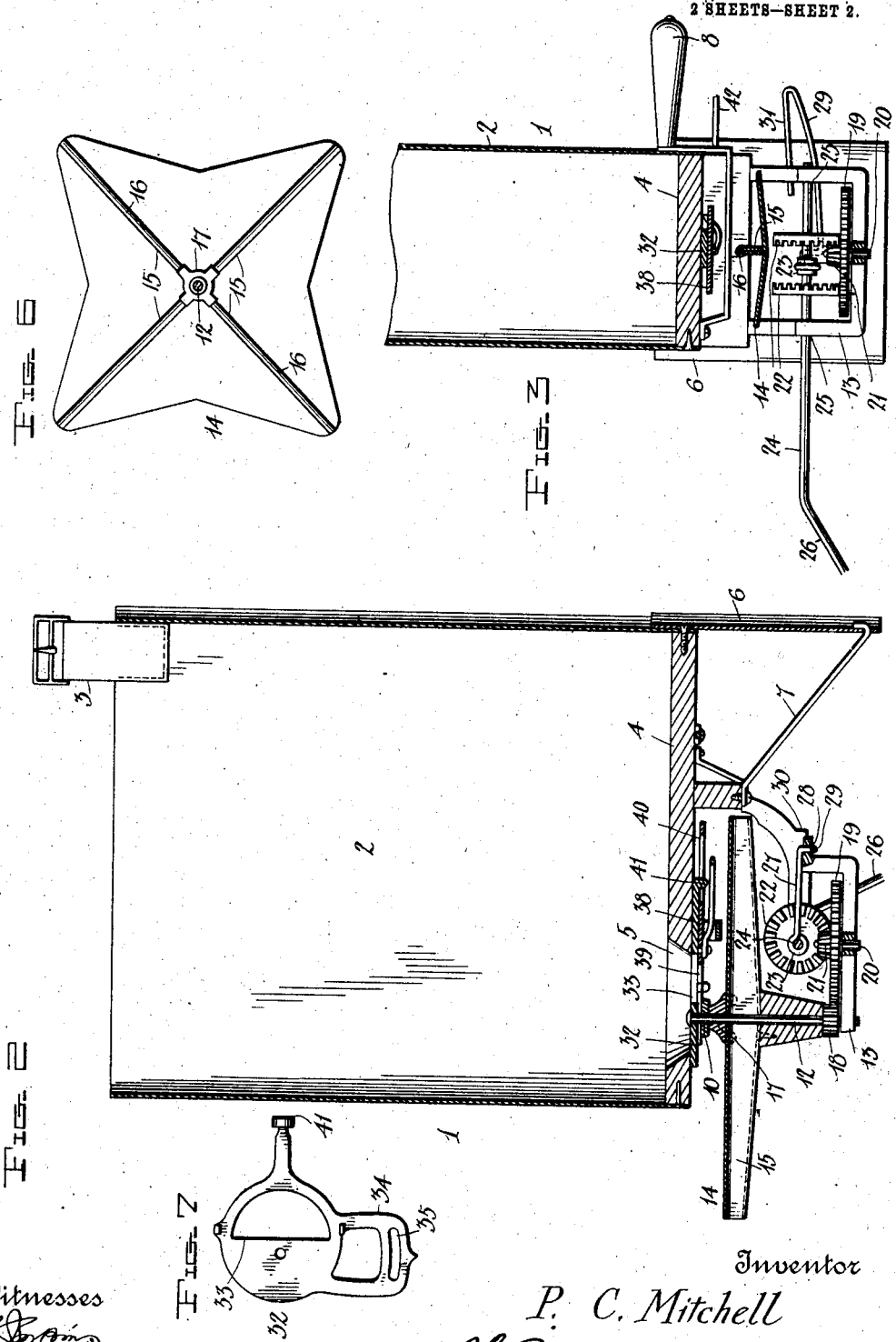
Witnesses
Inventor
P. C. Mitchell
by H. B. Willson & Co.
Attorneys

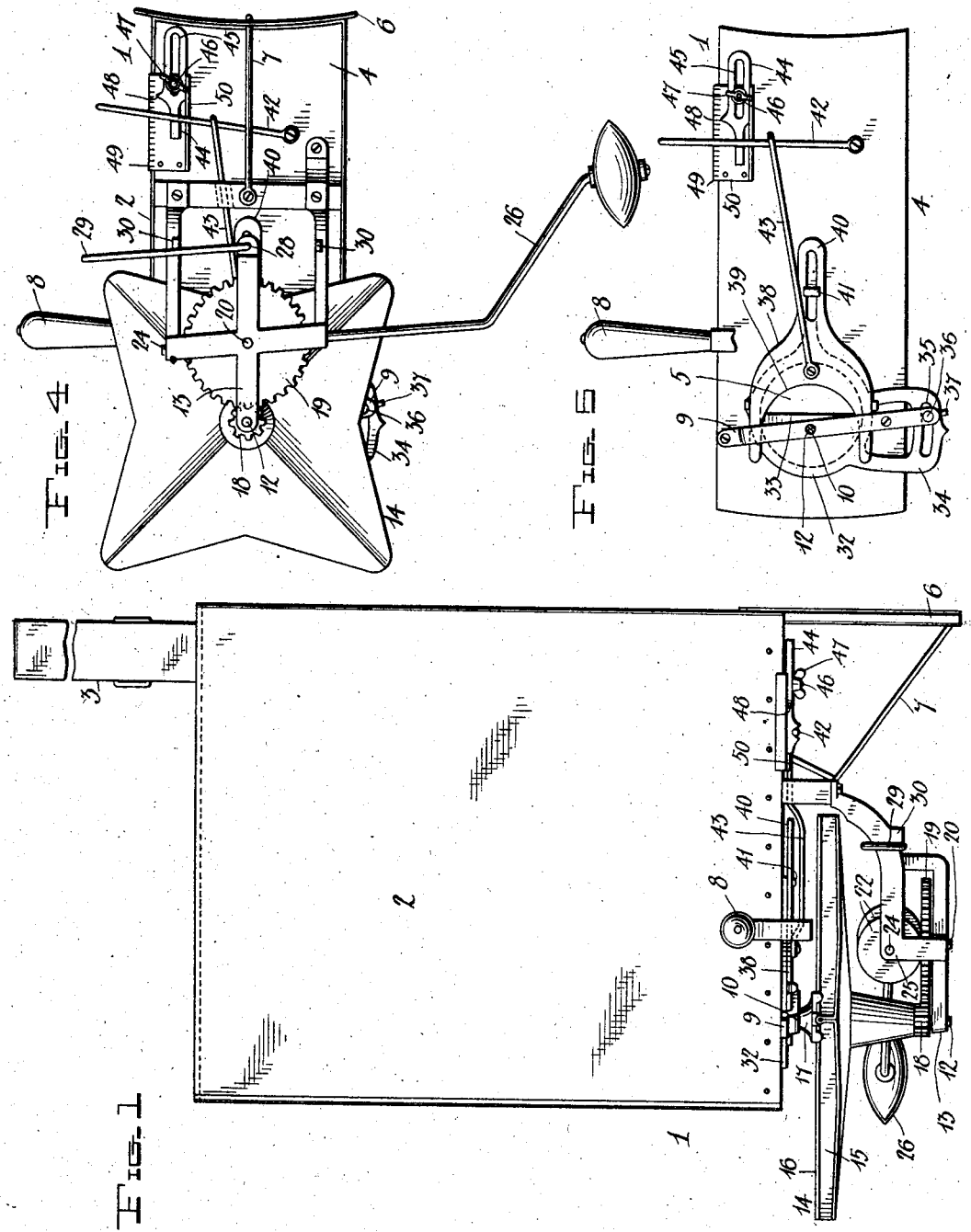

UNITED STATES PATENT OFFICE.

PRESTON C. MITCHELL, OF HOMER, MICHIGAN.

SEED-PLANTER.

No. 834,839.      Specification of Letters Patent.      Patented Oct. 30, 1906.

Application filed April 26, 1906. Serial No. 313,861.

*To all whom it may concern:*

Be it known that I, PRESTON C. MITCHELL, a citizen of the United States, residing at Homer, in the county of Calhoun and State of Michigan, have invented certain new and useful Improvements in Seed-Planters; and I do declare the following to be a full, clear, and exact description of the invention, such as will enable others skilled in the art to which it appertains to make and use the same.

This invention relates to improvements in hand-operated seed-planters.

The object of the invention is to provide a planter of this character having an adjustable feed-plate by means of which the seed may be dropped or fed onto the distributing-wheel, thus facilitating the throwing of the seed in any desired direction.

A further object is to provide a hand-planter having a reversing mechanism connected to the operating-gears, whereby the distributing-wheel may be turned to the right or left without changing the motion of the crank shaft or handle.

With the above and other objects in view the invention consists of certain novel features of construction, combination, and arrangement of parts, as will be hereinafter described and claimed.

In the accompanying drawings, Figure 1 is a side view of a seed-planter constructed in accordance with the invention. Fig. 2 is a longitudinal vertical sectional view of the same. Fig. 3 is a similar view taken at right angles to Fig. 2. Fig. 4 is a bottom plan view of the planter. Fig. 5 is a similar view of the bottom board of the hopper, showing the arrangement of the cut-off valve; and Fig. 6 is a detail plan view of the seed-distributing wheel. Fig. 7 is a detail plan view of the adjustable feed-plate removed from the hopper-bottom.

Referring more particularly to the drawings, 1 denotes the planter, having a hopper 2, the body portion of which is preferably formed of canvas or other flexible material and is provided at its upper end with straps 3, by means of which the same may be suspended from the shoulders of the operator. The bottom of the hopper is preferably in the form of a board 4, having near its outer end a seed-discharge passage or opening 5. On the inner end of the board 4 is secured a vertically-disposed breastplate 6, rigidly connected to the board by means of a brace 7. The breastplate 6 is adapted to rest against the body of the operator when the planter is in working position, thereby aiding in holding the machine. On the left-hand side of the board 4 is secured a rigid handle 8, adapted to be grasped by the left hand of the operator when the machine is in use.

Secured to the lower side of the board 4 adjacent to the outer end thereof is a transversely-disposed guide-bar 9, provided substantially midway between its ends with a stepped bearing 10, in which is journaled the upper end of a distributing-wheel shaft 12. The lower end of this shaft 12 is journaled in the outer end of a bracket 13, also secured to the under side of the board 4, as shown. On the upper end of the shaft 12 is fixedly mounted a distributing-wheel 14, said wheel consisting of a plate which is substantially in the shape of a four-pointed star and is dished or concaved, so that the outer edges of the plate are somewhat higher than the central portion thereof.

Extending radially from the center of the plate to each of its four corners or points is a rib 15, said rib being preferably bent from the body of the plate. The ribs are formed at their upper edges with a strengthening-bead 16. The inner ends of the ribs are connected together at the center of the plate and to the upper end of the shaft 12 by means of a casting 17, having radially-disposed arms, the outer ends of which are turned downwardly and bifurcated to receive the inner ends of the ribs, as shown.

On the lower end of the shaft 12 is secured a spur-gear pinion 18, which meshes with a driving-gear 19, mounted on a short stub-shaft 20, journaled in the bracket 13. Connected to or formed integrally with the gear 19 is an upwardly-projecting beveled pinion 21, with which is adapted to be engaged one or the other of the gears 22 of a reversing mechanism 23. Said reversing-gears are properly spaced apart and fixedly mounted on a drive-shaft 24, which is slidably mounted in bearings 25, formed in the bracket 13, as shown. The shaft 24 is provided on one end with a crank-handle 26, by means of which the same is turned by the operator. In order that the reversing-gears 22 may be engaged with the pinion 21 to turn the distributing-wheel in one direction or the other, a shifting-lever 27 is provided, said lever being pivoted in a bearing 28, formed in the bracket 13 and provided with a right-angularly-projecting spring-metal arm 29, which projects laterally at one side of the machine and is adapted to bear against the under side of the bracket 13 and to engage one end or the other of a downwardly-projecting lug 30 formed on said bracket. The laterally-projecting end of the shifting-lever 27 is bent upon itself to form a spring-retaining arm 31, which is adapted to engage the upper side of the bracket-arm, whereby the radially-projecting end of the lever will be held in yielding engagement with the lug 30. When the lever is engaged with one end of the lug 30, one of the reversing-gears 22 will be in engagement with the beveled pinion 21 to turn the distributing-wheel in one direction, and when the shifting-lever is brought into engagement with the opposite end of the lug 30 the other reversing-gear will be brought into engagement with the opposite side of the pinion 22, thus causing the distributing-wheel to be revolved in the opposite direction, as will be understood.

Pivotally mounted on the under side of the hopper-bottom 4 is a feed-plate 32, said plate having formed therein a substantially semicircular discharge-opening 33, through which the seed passing through the opening 5 in the board 4 is adapted to pass before dropping into the distributing-wheel. The feed-plate 32 is adapted to be shifted or turned in one direction or the other upon its pivot to change the position of the discharge-opening 33 formed therein, thereby causing the seed from the hopper to drop upon the distributing-wheel at different points, thus facilitating the throwing of the seed in the desired direction. One side of the plate 32 is provided with a lateral projection 34, in which is formed a segmental slot 35, through which and an extension of the guide-bar 9 is adapted to be passed a bolt 36. On the upper end of the bolt 36 is screwed a clamping-nut 37, by means of which the plate 32 may be held in any desired position.

Slidably mounted between the under side of the plate 32 and the guide-bar 9 is a cut-off plate or valve 38, said plate being provided with a semicircular recess 39, which when the plate is in a retracted position is adapted to aline with the discharge-passage 33 in the feed-plate 32. Said passage 33 in the plate 32 is reduced in size by shifting the cut-off plate forwardly, as will be understood. The inner end of the plate or valve 38 is provided with a longitudinally-slotted extension 40, which is adapted to be engaged by a headed guide-lug 41, formed on an extended end of the feed-plate 32, as shown.

The valve-plate 38 is provided with a shifting-lever 42, which is secured to the plate by means of a connecting-rod 43. The lever 42 is also engaged with a gage-plate 44, provided with a longitudinally-disposed slot 45, by means of which it is slidably connected to the under side of the board 4 by a bolt 46 and is held in locked engagement with the board by means of a clamping-nut 47, screwed upon the bolt 46, as shown. By means of this connection of the gage-plate 44 and the engagement of the shifting-lever 42 therewith the valve-plate 38 is held in its adjusted positions. The gage-plate 44 is provided with a laterally-projecting index-pointer 48, which coacts with a scale 49, arranged on a scale-plate 50, secured to the under side of the board 4, as shown.

By providing a feed-plate and arranging the same as herein shown and described the throwing of the seed by the distributing-wheel in the direction desired will be greatly facilitated, so that on windy days the seeds may be thrown with the wind, thus preventing the wasting of the seed or the scattering of the same in undesirable places.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. In a seed-planter of the character described, the combination with a bag or hopper adapted to be suspended from the shoulders of the operator and having an apertured bottom plate, of a feed-plate arranged beneath the apertured bottom plate of said hopper, a regulating-valve adapted to coact with said feed-plate, means to hold said valve and said feed-plate in their adjusted positions, a seed-distributing wheel or plate revolubly mounted below the feed-opening in said hopper and feed-plate, a revolving mechanism for said wheel, and means to reverse the movement of said revolving mechanism, substantially as described.

2. In a seed-planter of the character described, the combination with a bag or hopper adapted to be suspended from the shoulders of the operator and having an apertured bottom plate, of a feed-plate arranged beneath the apertured bottom plate of said hopper, a regulating-valve adapted to coact with said feed-plate, a valve-adjusting lever, a rod to connect said lever with said valve, an adjustable gage-plate connected to said lever, a clamping-nut to hold said plate in its adjusted positions, a seed-distributing wheel mounted beneath said hopper, an operating mechanism to drive said wheel, and means to reverse the movement of said operating mechanism, substantially as described.

3. In a seed-planter of the character described, the combination with a bag or hopper adapted to be suspended from the shoulders of the operator and having an apertured bottom plate, of a feed-plate arranged beneath the apertured bottom plate of said hopper, a regulating-valve adapted to coact with said feed-plate, a valve-adjusting lever, a rod to connect said lever with said valve, an adjustable gage-plate connected to said lever, a clamping-nut to hold said plate in its adjusted positions, a seed-distributing wheel mounted beneath said hopper, operating-gears connected to said wheel, a drive-shaft, reversing-gears arranged thereon, and a shifting-lever connected with said reversing-gears whereby the same may be shifted to cause said distributing-wheel to be turned in one direction or the other, substantially as described.

In testimony whereof I have hereunto set my hand in presence of two subscribing witnesses.

PRESTON C. MITCHELL.

Witnesses:
MYRON H. NICHOLS,
HARRY ROBERTS.